US011413758B2

(12) United States Patent
Mukou et al.

(10) Patent No.: US 11,413,758 B2
(45) Date of Patent: Aug. 16, 2022

(54) OPERATION TOOL FOR GRASPING WORKPIECE INCLUDING CONNECTOR AND ROBOT APPARATUS INCLUDING OPERATION TOOL

(71) Applicant: FANUC CORPORATION, Yamanashi (JP)

(72) Inventors: Hiroshi Mukou, Yamanashi (JP); Yoshihito Ooagu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 343 days.

(21) Appl. No.: 16/811,006

(22) Filed: Mar. 6, 2020

(65) Prior Publication Data

US 2020/0290206 A1 Sep. 17, 2020

(30) Foreign Application Priority Data

Mar. 14, 2019 (JP) .............................. JP2019-047656

(51) Int. Cl.
*B25J 9/16* (2006.01)
*B25J 15/00* (2006.01)
*H01R 43/26* (2006.01)
*B25J 19/02* (2006.01)

(52) U.S. Cl.
CPC ........... *B25J 9/1687* (2013.01); *B25J 9/1612* (2013.01); *B25J 9/1697* (2013.01); *B25J 15/0004* (2013.01); *B25J 15/0028* (2013.01); *B25J 15/0052* (2013.01); *B25J 19/023* (2013.01); *H01R 43/26* (2013.01)

(58) Field of Classification Search
CPC ...... B25J 9/1687; B25J 9/1612; B25J 9/1697; B25J 15/0004; B25J 15/0028; B25J 15/0052; B25J 19/023; B25J 9/0009; B25J 13/08; B25J 15/00; B25J 15/02; B25J 19/04; H01R 43/26; G05B 2219/39506

See application file for complete search history.

(56) References Cited

U.S. PATENT DOCUMENTS

| 2016/0297075 | A1 | 10/2016 | Lee et al. | |
| 2019/0329425 | A1* | 10/2019 | Ochiishi | B25J 15/0057 |
| 2020/0276712 | A1* | 9/2020 | Masukawa | B25J 9/1612 |
| 2020/0276715 | A1* | 9/2020 | Masukawa | B25J 9/1697 |

FOREIGN PATENT DOCUMENTS

| JP | H1-274987 | A | 11/1989 |
| JP | H69183 | A | 3/1992 |
| JP | 2005-11580 | A | 1/2005 |
| JP | 20096460 | A | 1/2009 |
| JP | 2014-176917 | A | 9/2014 |
| JP | 2017189850 | A | 10/2017 |
| WO | 2018193754 | A1 | 10/2018 |

* cited by examiner

*Primary Examiner* — Robert T Nguyen
(74) *Attorney, Agent, or Firm* — Hauptman Ham, LLP

(57) ABSTRACT

An operation tool includes a grasping mechanism that grasps a wire harness. The grasping mechanism includes a plurality of chuck parts that grasp a wire member, and two clamping members that are arranged so as to face each other in order to sandwich the wire member. A drive device of the grasping mechanism includes a movement mechanism that moves the second clamping member toward the first clamping member. The drive device includes a rotation mechanism that moves the first clamping member so as to rotate the wire member while the wire member is grasped by the chuck parts.

8 Claims, 11 Drawing Sheets

OPERATION TOOL FOR GRASPING WORKPIECE INCLUDING CONNECTOR AND ROBOT APPARATUS INCLUDING OPERATION TOOL

RELATED APPLICATIONS

The present application claims priority of Japanese Application Number 2019-047656, filed on Mar. 14, 2019, the disclosure of which is hereby incorporated by reference herein in its entirety.

BACKGROUND OF THE INVENTION

1. Field of the Invention

The present invention relates to an operation tool for grasping a workpiece including a connector, and a robot apparatus including the operation tool.

2. Description of the Related Art

In a robot apparatus, an operation tool corresponding to the type of operation is attached to a robot, and thus various types of work can be performed while the position and direction of the operation tool is changed. In the process of manufacturing products, a wire harness, which includes a wire member and a connector secured to an end of the wire member, may be connected to a predetermined device. In other words, the connector disposed at an end of the wire member may be connected to a receiving connector of a predetermined device.

When the connector is inserted, the direction of the connector with respect to the receiving connector is determined. When the wire harness is connected to the receiving connector, it is necessary to match the direction of the connector with the direction of the insertion port of the receiving connector. Thus, it is necessary to adjust the direction of the connector according to the direction of the insertion port.

In the prior arts, a robot apparatus that grasps a connector of a wire harness, one end of which is secured, and inserts the connector into a receiving connector is known (for example, Japanese Unexamined Patent Publication No. 2005-11580A and Japanese Unexamined Patent. Publication No. 2014-176917A).

Further, in the prior arts, a hand, which includes a grasping member for operating a workpiece within the hand in order to adjust the direction of the workpiece grasped by the hand, is known (for example, Japanese Unexamined Patent Publication No. 1-274987A).

SUMMARY OF THE INVENTION

If the direction of a connector of a wire harness placed on a placement surface is appropriate, when the connector is grasped by an operation tool, the direction of the connector relative to the operation tool is determined. For this reason, a robot changes its position and orientation and thereby connects the wire harness to a receiving connector of another device.

However, the direction of the connector may not be determined depending on the state of a workpiece that is being conveyed. For example, the connector may have a rectangular cross-sectional shape. When the connector is placed on the placement surface of the workpiece, the connector may be disposed so as to extend in the horizontal direction or may be disposed so as to extend in the vertical direction. In this respect, when the connector is tried to be inserted into an insertion port of the receiving connector, the direction of the connector may not match with the direction of the insertion port. If the direction of the connector does not match with the direction of the insertion port, the connector cannot be inserted into the insertion port. Further, if the connector is forced to be inserted into the insertion port when the directions do not match with each other, the connector may be damaged.

It is conceivable to adjust the direction of the connector by changing the position and orientation of the robot. However, in some cases, the direction of the connector cannot match with the direction of the insertion port within the operation range of the robot.

Moreover, in the prior arts, the connector of the wire harness, one end of which is secured, can be connected to a predetermined portion. However, because the one end is secured, the wire harness cannot be conveyed. For example, after a connector secured to one end of a wire member is connected to one receiving connector, a connector secured to the other end cannot be connected to another receiving connector.

An operation tool according to an aspect of the present disclosure is attached to a robot. The operation tool includes a grasping mechanism for grasping a workpiece including a wire member and a connector attached to an end of the wire member. The grasping mechanism includes a plurality of chuck parts formed so as to grasp the wire member. The grasping mechanism includes two clamping members arranged opposite to each other so as to sandwich the wire member in a region between the plurality of chuck parts. The grasping mechanism includes a drive device for driving members constituting the grasping mechanism. The drive device includes a movement mechanism for moving at least one clamping member in a direction in which the two clamping members move closer to or away from each other. The drive device includes a rotation mechanism for relatively moving one of the two clamping members with respect to the other clamping member so as to rotate the wire member in a state in which the wire member is grasped by the chuck parts. The movement mechanism is driven so that the wire member is sandwiched by the two clamping members, and the rotating mechanism is driven so that the wire member is rotated around the axial direction of the wire member.

A robot apparatus according to an aspect of the present disclosure includes the above operation tool, a robot for moving the operation tool, and a controller for controlling the operation tool and the robot. The robot apparatus includes a detector for detecting the direction of the connector when the operation tool grasps the wire member. The controller detects the direction of the connector based on the output of the detector. The controller sends a command for rotating the wire member to the drive device when the direction of the connector deviates from a predetermined determination range. When the direction of the connector remains within the determination range, the controller controls the position and orientation of the robot so that the connector is inserted into a predetermined portion.

DETAILED DESCRIPTION

Referring to FIGS. 1 to 11, an operation tool and a robot apparatus including the operation tool in an embodiment will be described. The robot apparatus of the present embodiment conveys a workpiece, which includes a wire member and connectors attached to ends of the wire member, and connects the connectors to another device.

Figure 1:
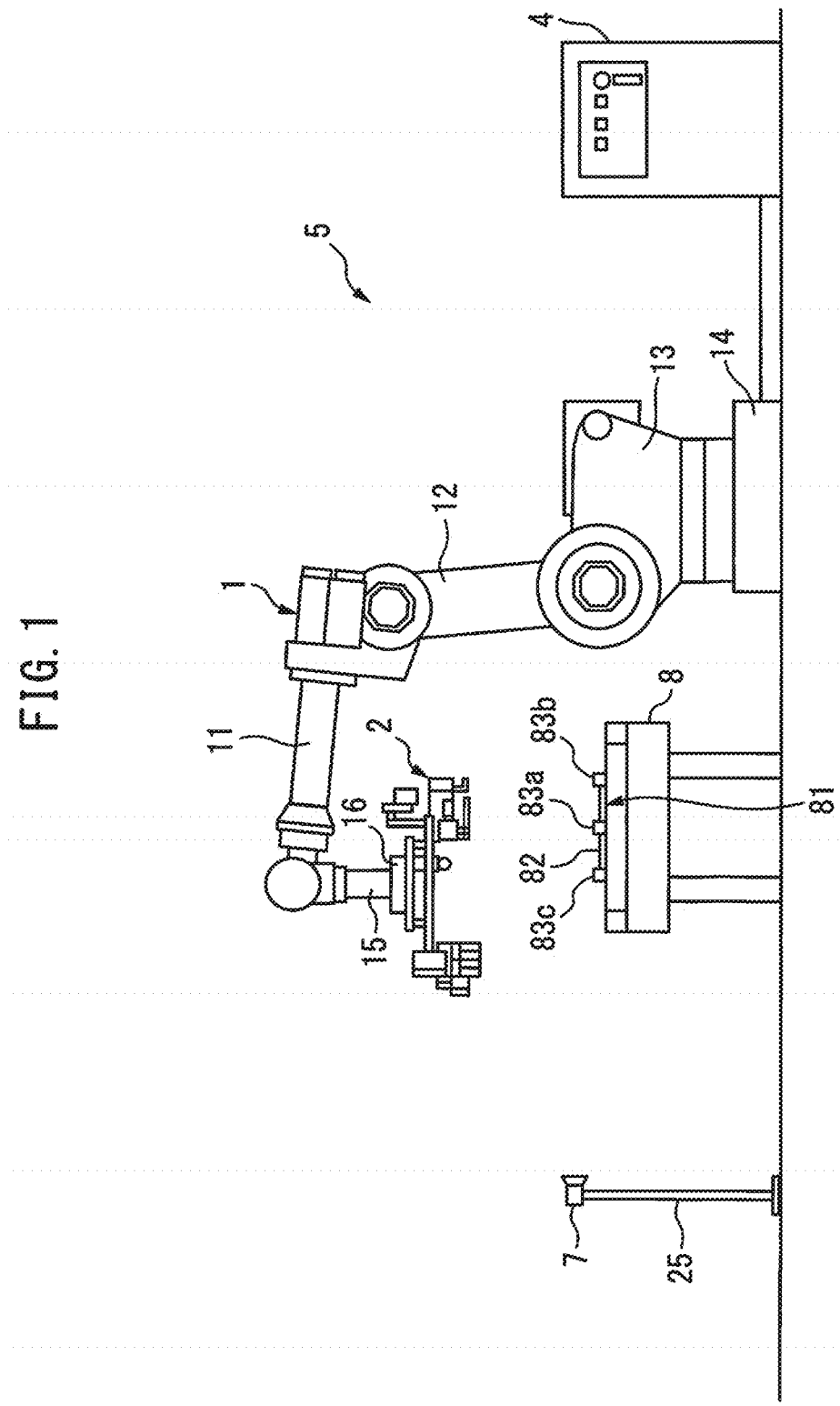
FIG. 1 is a schematic view of a robot apparatus in an embodiment.

FIG. 1 is a schematic view of the robot apparatus in the present embodiment. The robot apparatus 5 includes an operation tool 2 as an end effector and a robot 1 that moves the operation tool 2. The operation tool 2 is attached to the robot 1. The robot 1 of the present embodiment is an articulated robot including a plurality of joints.

The robot 1 includes a base 14 and a turning base 13 supported by the base 14. The base 14 is secured to an installation surface. The turning base 13 is formed so as to rotate with respect to the base 14. The robot 1 includes an upper arm 11 and a lower arm 12. The lower arm 12 is rotatably supported by the turning base 13 via a joint. The upper arm 11 is rotatably supported by the lower arm 12 via a joint. Further, the upper arm 11 rotates around its rotation axis parallel to the extending direction of the upper arm 11.

The robot 1 includes a wrist 15 connected to an end of the upper arm 11. The wrist 15 is rotatably supported by the upper arm 11 via a joint. The wrist 15 includes a flange 16 that is formed rotatably. The operation tool 2 is secured to the flange 16. The robot 1 of the present embodiment has six drive axes, but is not limited to this configuration. Any robot that can change the position and direction of the operation tool 2 can be adopted.

The operation tool 2 of the present embodiment grasps or releases a wire harness 81 as a workpiece. The wire harness 81 includes a wire member 82 that extends linearly. The wire harness 81 includes a first connector 83a, a second connector 83b, and a third connector 83c, which are attached to ends of the wire member 82. The wire member 82 can include, for example, an electric wire for supplying electricity or a signal wire for transmitting signals. The wire member 82 may include a plurality of electric wires or a plurality of signal wires. Further, the plurality of electric wires or the plurality of signal wires may be secured to one another with, for example, a binding band or an adhesive tape.

The robot apparatus 5 of the present embodiment includes a conveyor 8 as a peripheral device disposed around the robot 1. The conveyor 8 conveys the wire harness 81 from another position to a position at which the operation tool 2 can grasp the wire harness.

The operation tool 2 in the present embodiment grasps the wire member 82 of the wire harness 81. The robot apparatus 5 includes an inclination detection device that detects the directions of the connectors 83a, 83b and 83c when the wire member 82 of the wire harness 81 is grasped. The inclination detection device of the present embodiment includes, as a detector, an inclination detection camera 7 disposed in the vicinity of the robot 1. The inclination detection camera 7 is secured to a pedestal 25. The inclination detection camera 7 is disposed at a position in which an image of each of the connectors 83a, 83b and 83c of the wire harness 81 grasped by the operation tool 2 can be captured by changing the position and orientation of the robot 1. It should be noted that the inclination detection camera 7 in the present embodiment is secured to the ground, but is not limited to this configuration. The camera may be formed movably.

In the robot apparatus 5 of the present embodiment, the wire harness 81 is conveyed by the conveyor 8. The robot 1 changes its position and orientation so that the operation tool 2 grasps the wire harness 81. Further, the robot 1 moves the wire harness 81 to the vicinity of the inclination detection camera 7. The inclination detection camera 7 captures an image of each of the connectors 83a, 83b and 83c. The operation tool 2 adjusts the direction of each of the connectors 83a, 83b and 83c in the operation tool 2 based on the image captured by the inclination detection camera 7.

A working table is disposed in the vicinity of the robot 1. A printed board as a workpiece, to which the wire harness 81 is to be attached, is disposed on the working table. Receiving connectors, to which the connectors 83a, 83b and 83c are to be connected, are disposed on this printed board. The robot 1 conveys the wire harness 81 to the vicinity of the printed board by changing its position and orientation. The robot apparatus 5 performs an operation for inserting the connectors 83a, 83b and 83c into the insertion ports of the receiving connectors.

Figure 2:
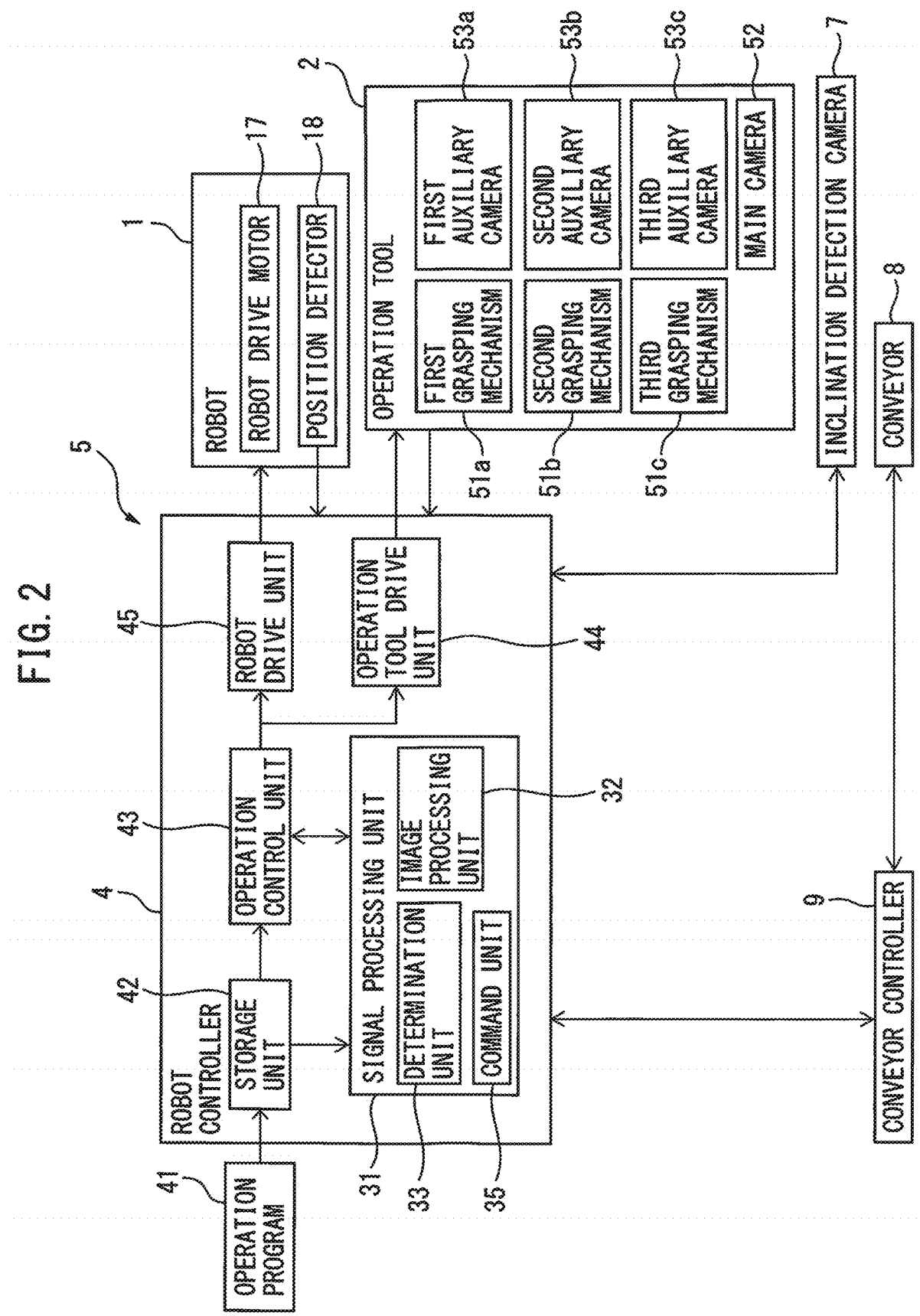
FIG. 2 is a block diagram of the robot apparatus in the embodiment.

FIG. 2 is a block diagram of the robot apparatus of the present embodiment. Referring to FIGS. 1 and 2, the robot 1 includes a robot drive device that changes the position and orientation of the robot 1. The robot drive device includes a plurality of robot drive motors 17 that drive components such as an arm and a wrist. Each robot drive motor 17 is disposed for the corresponding component. The robot drive motors 17 are driven and thereby changes the direction of each component.

The controller for the robot apparatus 5 includes a robot controller 4. The robot controller 4 includes an arithmetic processing device (computer) having a CPU (Central Processing Unit) as a processor. The arithmetic processing unit has, for example, a RAM (Random Access Memory) and a ROM (Read Only Memory), which are connected to the CPU via a bus. In order to control the robot 1, the operation tool 2, the conveyor 8, and the inclination detection camera 7, an operation program 41, which has previously been created, is input to the robot controller 4. The robot controller 4 includes a storage unit 42 that stores information related to control of the robot apparatus 5. The storage unit 42 can be configured by a storage medium capable of storing information, for example, a volatile memory, a nonvolatile memory, or a hard disk. The operation program 41 is stored in the storage unit 42. The robot apparatus 5 of the present embodiment conveys the wire harness 81 based on the operation program 41.

The robot controller 4 includes an operation control unit 43 that sends an operation command. The operation control unit 43 corresponds to the processor that is driven according to the operation program 41. The processor that functions as the operation control unit 43 is formed so as to be able to read information stored in the storage unit 42. The processor reads the operation program 41 and performs a control operation defined in the operation program 41, so as to function as the operation control unit 43.

The operation control unit 43 sends an operation command for driving the robot 1 to the robot drive unit 45 based on the operation program 41. The robot drive unit 45 includes an electric circuit that drives the robot drive motors 17. The robot drive unit 45 supplies electricity to the robot drive motors 17 based on the operation command.

Further, the operation control unit 43 sends an operation command for driving the operation tool 2 to the operation tool drive unit 44 based on the operation program 41. The operation tool drive unit 44 includes an electric circuit that drives a drive device 65 for the operation tool 2. The operation tool drive unit 44 supplies electricity to the drive device 65 for the operation tool based on the operation command. Further, the operation control unit 43 sends a command for capturing an image to the inclination detection camera 7 based on the operation program 41.

The robot 1 includes a state detector for detecting the position and orientation of the robot 1. The state detector in the present embodiment includes position detector 18 which is attached to the corresponding robot drive motor 17 for drive axis of the component such as the arm. The robot controller 4 can acquire the direction of the component on each drive axis by the output of the state detector. For example, each position detector 18 detects a rotation angle of the corresponding robot drive motor 17 being driven. The robot controller 4 detects the position and orientation of the robot 1 based on the output of the position detectors 18.

The controller for the robot apparatus 5 includes a conveyor controller 9 that controls the conveyor 8. The conveyor controller 9 includes an arithmetic processing device (computer) including, for example, a CPU and a RAM. The conveyor controller 9 is formed so as to be able to mutually communicate with the robot controller 4. The conveyor controller 9 receives a command from the robot controller 4 and causes the conveyor 8 to be driven. Moreover, the conveyor controller 9 causes the conveyor 8 to stop when the conveyor 8 finishes conveying the wire harness 81 to a predetermined position. The conveyor controller 9 transmits a signal indicating that the conveyor 8 has stopped to the robot controller 4.

The controller for the robot apparatus 5 of the present embodiment includes a robot controller 4 that controls the robot 1, the operation tool 2, and the inclination detection camera 7, and a conveyor controller 9 that controls the conveyor 8, but is not limited to this configuration. The robot apparatus 5 can be formed so as to control the robot 1, the operation tool 2, the inclination detection camera 7, and the conveyor 8 with any number of controllers.

Figure 3:
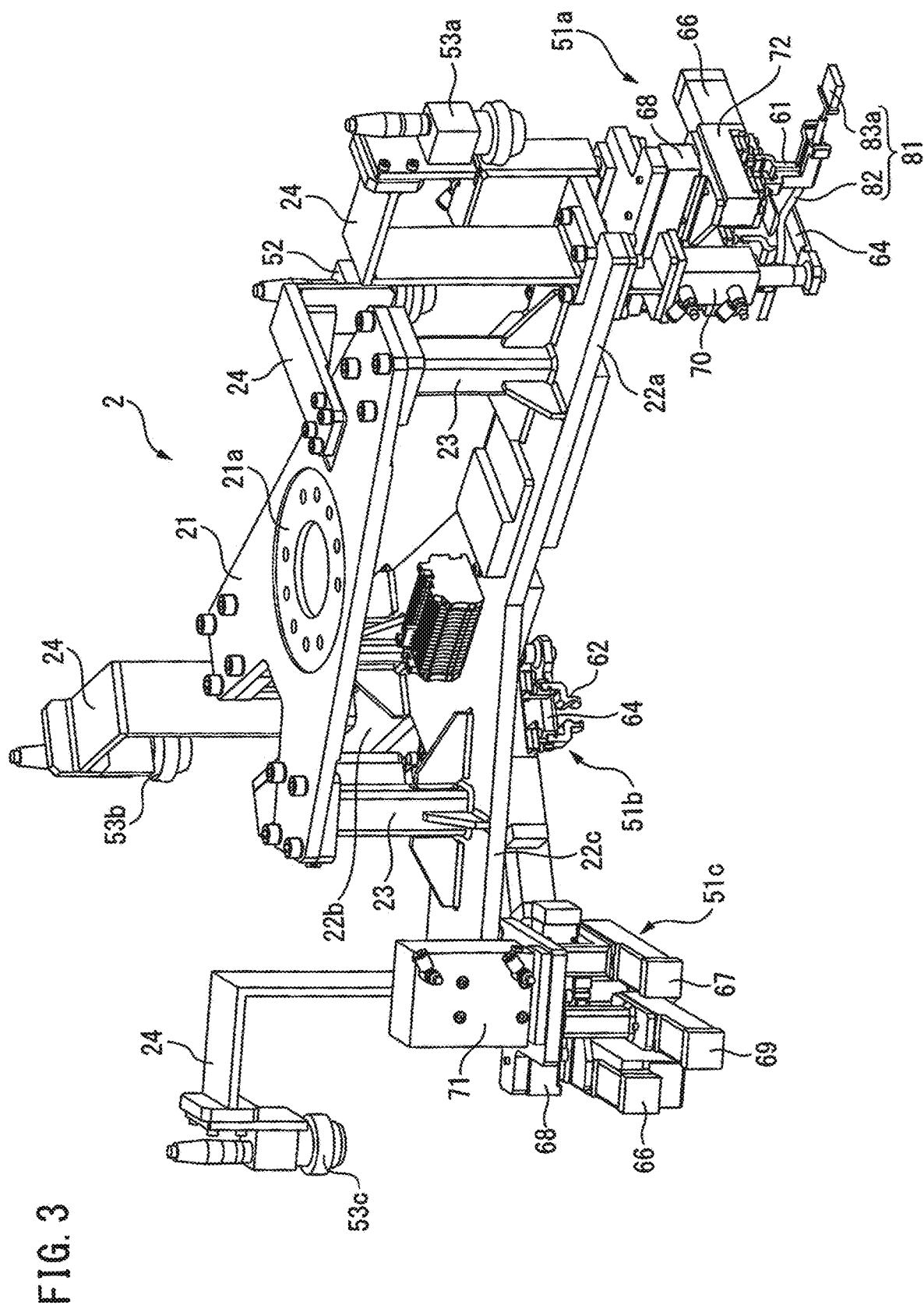
FIG. 3 is a perspective view of an operation tool in the embodiment.
Figure 4:
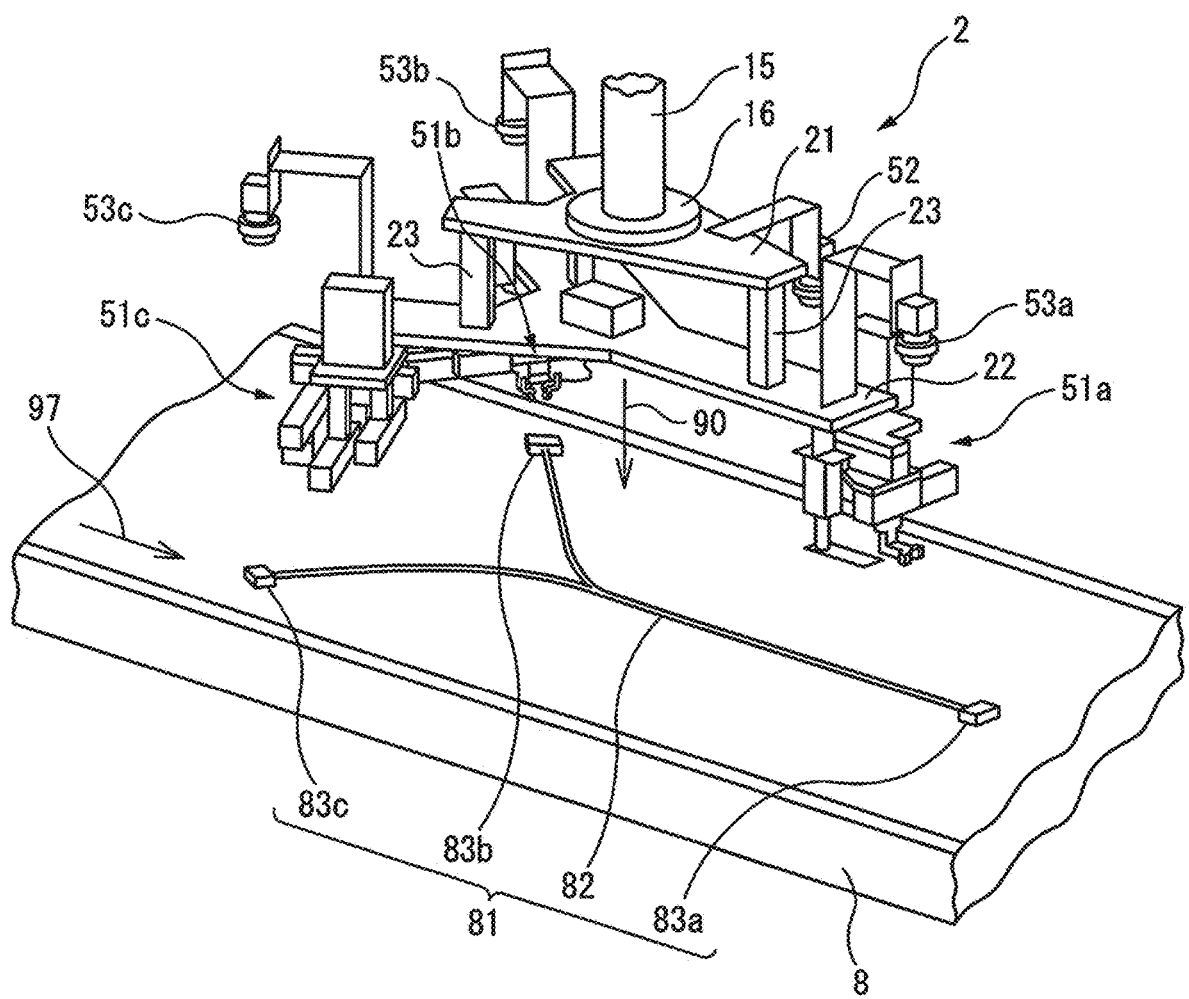
FIG. 4 is a perspective view of the robot apparatus that tries to grasp a wire harness.

The operation tool 2 in the present embodiment will now be described in detail. FIG. 3 is a perspective view of the operation tool in the present embodiment. FIG. 4 is a perspective view of the operation tool, the wire harness, and the conveyor. FIG. 4 shows a state before the operation tool 2 grasps the wire harness 81. Referring to FIGS. 2 to 4, the operation tool 2 in the present embodiment includes a base member 21 coupled to the robot 1. The base member 21 is formed into a plate shape. The base member 21 has a coupling part 21a that is coupled to the flange 16 of the wrist 15. The operation tool 2 includes a support member 22 secured to the base member 21 via pillar members 23.

The operation tool 2 includes a grasping mechanism for grasping the wire harness 81. The operation tool 2 of the present embodiment includes a first grasping mechanism 51a, a second grasping mechanism 51b, and a third grasping mechanism 51c. The grasping mechanisms 51a, 51b and 51c of the present embodiment are supported by the support member 22.

The wire harness 81 in the present embodiment has a plurality of connectors 83a, 83b and 83c secured to the wire member 82. The wire member 82 of the present embodiment is branched in the middle thereof. The connectors 83a, 83b and 83c are connected to the tips of the wire member 82. The wire harness 81 is conveyed by the conveyor 8 as indicated by arrow 97.

The robot 1 moves the operation tool 2 to a position above the conveyed wire harness 81. The grasping mechanisms 51a, 51b and 51c are secured to the support member 22 at positions corresponding to the positions of the connectors 83a, 83b and 83c. The support member 22 has a shape corresponding to the shape of the wire harness 81. The support member 22 has extensions 22a, 22b and 22c formed along the wire member 82 to which the connectors 83a, 83b and 83c are arranged. For example, the extension 22a is formed along the extending direction of the wire member 82 to which the first connector 83a is secured. Further, the grasping mechanisms 51a, 51b and 51c are respectively secured to the tips of the extensions 22a, 22b and 22c. One grasping mechanism is secured corresponding to the position of one connector. The grasping mechanisms 51a, 51b and 51c are formed so as to grasp the wire member 82 in the vicinity of the respective connectors 83a, 83b and 83c.

Figure 5:
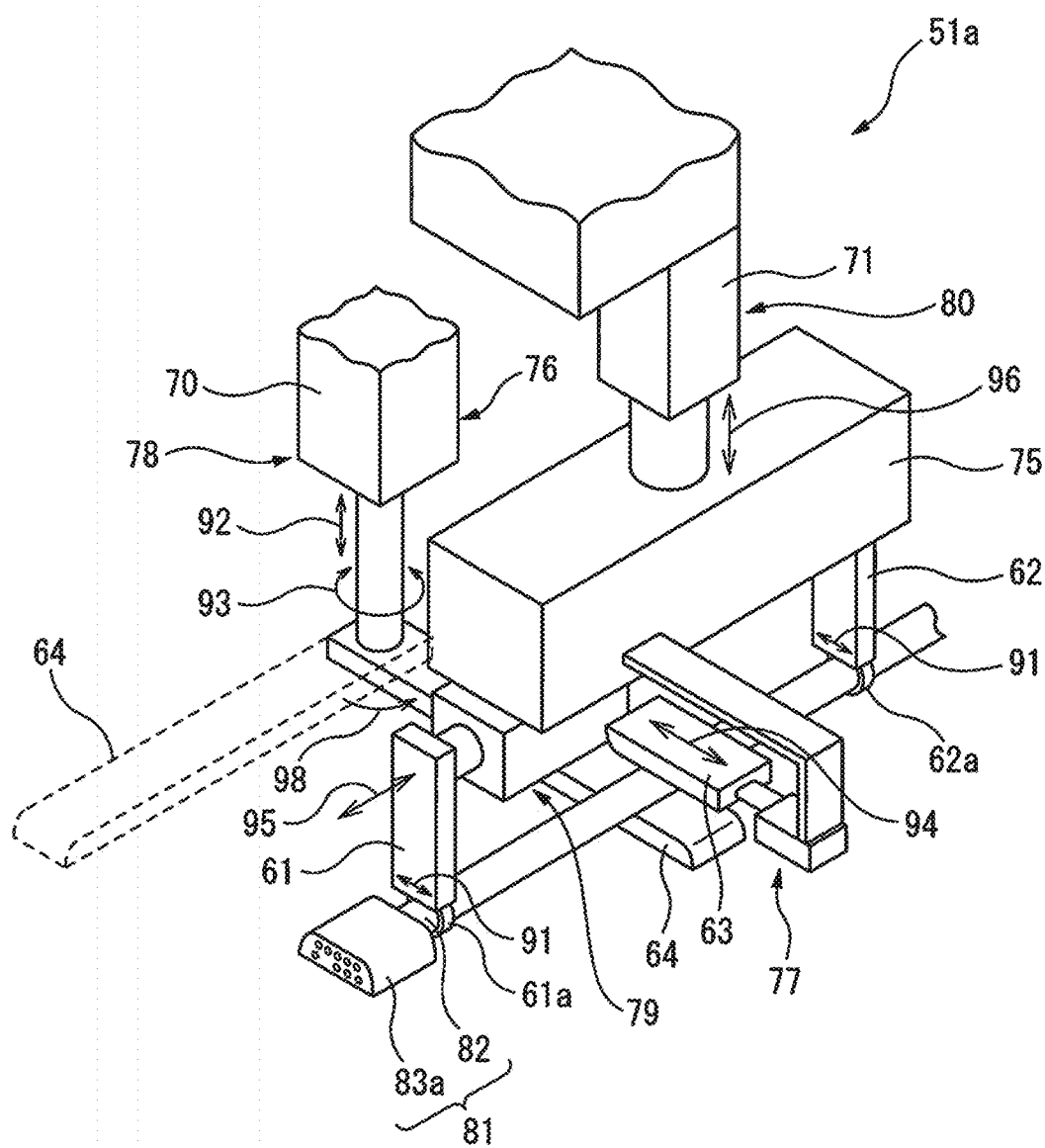
FIG. 5 is a schematic perspective view of a grasping mechanism of the operation tool.

FIG. 5 is a schematic view of the first grasping mechanism in the present embodiment. FIG. 5 schematically shows the grasping mechanism for understanding the configuration of the grasping mechanism. The three grasping mechanisms 51a, 51b and 51c have the same configuration. The first grasping mechanism 51a will now be described. The grasping mechanism 51a has a plurality of chuck parts 61 and 62 formed so as to grasp the wire member 82 of the wire harness 81. In the present embodiment, the first chuck part 61 and the second chuck part 62 are arranged. The chuck parts 61 and 62 are spaced from each other. The chuck parts 61 and 62 of the present embodiment are arranged so as to grasp the wire member 82 so that the wire member 82 extends linearly.

The chuck parts 61 and 62 respectively have claws 61a and 62a that move as indicated by arrow 91. The grasping mechanism 51a of the present embodiment includes a drive device 65 for driving members constituting the grasping mechanism 51a. The drive device 65 moves the claws 61a and 62a so that the chuck parts 61 and 62 can grasp and release the wire member 82.

The grasping mechanism 51a has a first clamping member 63 and a second clamping member 64, which are arranged so as to sandwich the wire member 82. Each clamping member 6, 64 in the present embodiment is formed into a plate shape. The clamping members 63 and 64 are respectively arranged in a region between the two chuck parts 61 and 62. The two clamping members 63 and 64 are arranged so as to face each other, on both sides of the upper side and the lower side of the wire member 82. Further, the extending direction of the first clamping member 63 and the extending direction of the second clamping member 64 are in parallel to each other. The clamping members 63 and 64 are arranged so as to extend in a direction perpendicular to the extending direction of the wire member 82 when the wire member 82 is grasped by the chuck parts 61 and 62.

The drive device 65 of the grasping mechanism 51a has a movement mechanism 76 that moves at least one clamping member of the two clamping members 63 and 64. The movement mechanism 76 adjusts the relative position of the clamping members 63 and 64 so that the two clamping members 63 and 64 move closer to or away from each other. The movement mechanism 76 in the present embodiment includes a clamping member drive cylinder 70 that moves the second clamping member 64 in the direction indicated by arrow 92. The movement mechanism 76 moves the second clamping member 64 in a direction perpendicular to the extending direction of the wire member 82.

The movement mechanism 76 of the present embodiment is formed so as to move the second clamping member 64, but is not limited to this configuration. The movement mechanism may be formed so as to move both the first clamping member 63 and the second clamping member 64. Alternatively, the movement mechanism may be formed so as to move the first clamping member 63 toward the second clamping member 64 without moving the second clamping member 64.

The drive device 65 of the grasping mechanism 51a has a rotation mechanism 77 that rotates the wire member 82 in a state in which the wire member 82 is grasped by the chuck parts 61 and 62. The rotation mechanism 77 moves one of the clamping members 63 and 64 relative to the other. The rotation mechanism 77 relatively moves the clamping members 63 and 64 in a direction perpendicular to the direction in which the wire member 82 is sandwiched. The rotation mechanism 77 is driven and thereby rotates the wire member 82 around the axial direction of the wire member 82.

The rotation mechanism 77 of the present embodiment moves the first clamping member 63 in the direction indicated by arrow 94. The first clamping member 63 moves in the extending direction of the first clamping member 63. It should be noted that the rotation mechanism may move the first clamping member 63 and the second clamping member 64 in directions opposite to each other. Alternatively, the rotation mechanism may be formed so as to move the second clamping member 64 while stopping the first clamping member 63.

The drive device 65 of the grasping mechanism 51a has a mechanism 78 that rotates the second clamping member 64 that is the outer one of the clamping members 63 and 64. The mechanism 78 for rotating the second clamping member 64 includes a clamping member drive cylinder 70. The clamping member drive cylinder 70 rotates the second clamping member 64 as indicated by arrow 93. When the chuck parts 61 and 62 grasp the wire member 82, the second clamping member 64 rotates so as to move away from the region where the wire member 82 is disposed.

In the state shown in FIG. 5, the second clamping member 64 is disposed so as to face the first clamping member 63. In this state, the second clamping member 64 is disposed in a region through which the wire member 82 passes when the wire member 82 is grasped by the chuck parts 61 and 62. The second clamping member 64 interferes with the wire member 82 when grasping the wire member 82 with the chuck parts 61 and 62. The second clamping member 64 rotates in the direction indicated by arrow 93 so as to move away from the region through which the wire member 82 passes. For example, the second clamping member 64 can be disposed in the position indicated by a broken line. The second clamping member 64 can be prevented from interfering with the wire member 82 when the chuck parts 61 and 62 grasp the wire member 82.

The drive device of the grasping mechanism 51a has a mechanism 79 that applies tension to the wire member 82 by moving at least one of the chuck parts 61 and 62. The mechanism 79 of the drive device 65 is formed so as to move at least one chuck part in a direction in which the chuck parts 61 and 62 move away from or closer to each other. The drive device 65 moves the chuck parts along the extending direction of the wire member 82 in a state in which the chuck parts 61 and 62 grasp the wire member 82.

In the present embodiment, the mechanism 79 for applying tension includes a chuck part drive motor that moves the first chuck part 61 in the direction indicated by arrow 95. The chuck parts 61 and 62 grasp the wire member 82 with a weak grasping force. In this state, the wire member 82 is movable or rotatable inside the claws 61a and 62a. Subsequently, the second chuck part 62 firmly grasps the wire member 82. Subsequently, the first chuck part 61 moves away from the second chuck part 62. The first chuck part 61 abuts with the first connector 83a. Further, when the first chuck part 61 moves away from the second chuck part 62, so that the wire member 82 is tensed. Subsequently, the first chuck part 61 grasps the wire member 82 with a strong grasping force. The chuck parts 61 and 62 can grasp the wire member 82 that is being tensed.

It should be noted that the first chuck part 61 may grasp the wire member 82 with a strong grasping force when the first chuck part 61 abuts with the first connector 83a. After that, the first chuck part 61 may move away from the second chuck part 62 so that the wire member 82 is tensed.

The mechanism 79 that applies tension to the wire member 82 can prevent the connectors 83a, 83b and 83c from oscillating when the connectors 83a, 83b and 83c are inserted into the receiving connectors of the printed board. The connectors 83a, 83b and 83c can be stably connected to the receiving connectors of the printed board.

The drive device 65 of the grasping mechanism 51a has a mechanism 80 that moves the grasping mechanism 51a away from or closer to the support member 22 of the operation tool 2. The mechanism 80 of the drive device 65 has a frame 75 that supports the chuck parts 61 and 62 and the first clamping member 63, and a frame drive cylinder 71 that moves the frame 75. The frame 75 is moved by the frame drive cylinder 71 in the direction indicated by arrow 96. Further, the second clamping member 64 is moved by the clamping member drive cylinder 70 in the direction indicated by arrow 92. In this way, the grasping mechanism 51a is formed so as to be movable along the direction toward the wire harness 81.

In the grasping mechanism 51a in the present embodiment, the chuck parts 61 and 62 grasp the wire member 82 of the wire harness 81. The grasping mechanism 51a can change the direction of the connector 83a by rotating the wire member 82 while grasping the wire harness 81. The grasping mechanism 51a can adjust the direction of the connector 83a with respect to the operation tool 2.

Referring to FIG. 4, the robot 1 changes its position and orientation and thereby arrange the grasping mechanisms 51a, 51b and 51c above the wire member 82 of the wire harness 81 to be grasped. The plurality of the grasping mechanisms 51a, 51b and 51c are secured to the support member 22 at positions corresponding to the positions of the connectors 83a, 83b and 83c. The operation tool 2 can be disposed so that the grasping mechanisms are arranged above the corresponding connectors. For this reason, after grasping one connector, the robot 1 slightly changes its position and orientation so as to grasp another connector. In order to grasp the plurality of connectors, it is not necessary to greatly change the position and orientation of the robot 1, and the operating time necessary for the robot apparatus 5 to grasp the wire harness 81 can be shortened.

The first grasping mechanism 51a is disposed above the first connector 83a. Referring to FIG. 5, the second clamping member 64 is disposed out of the region through which wire member 82 passes, as indicated by a broken line. The drive device 65 opens the claws 61a and 62a of the chuck parts 61 and 62. The robot 1 changes its position and orientation and thereby arranges the wire member 82 between the claws 61a and between the claws 62a. The claws 61a and 62a are closed so that the chuck parts 61 and 62 can grasp the wire member 82. The chuck parts 61 and 62 can firmly grasp the wire member 82. The drive device 65 rotates the second clamping member 64 as indicated by arrow 98, and thus the second clamping member 64 is disposed below the wire member 82. The second clamping member 64 is disposed so as to face the first clamping member 63.

Figure 6:
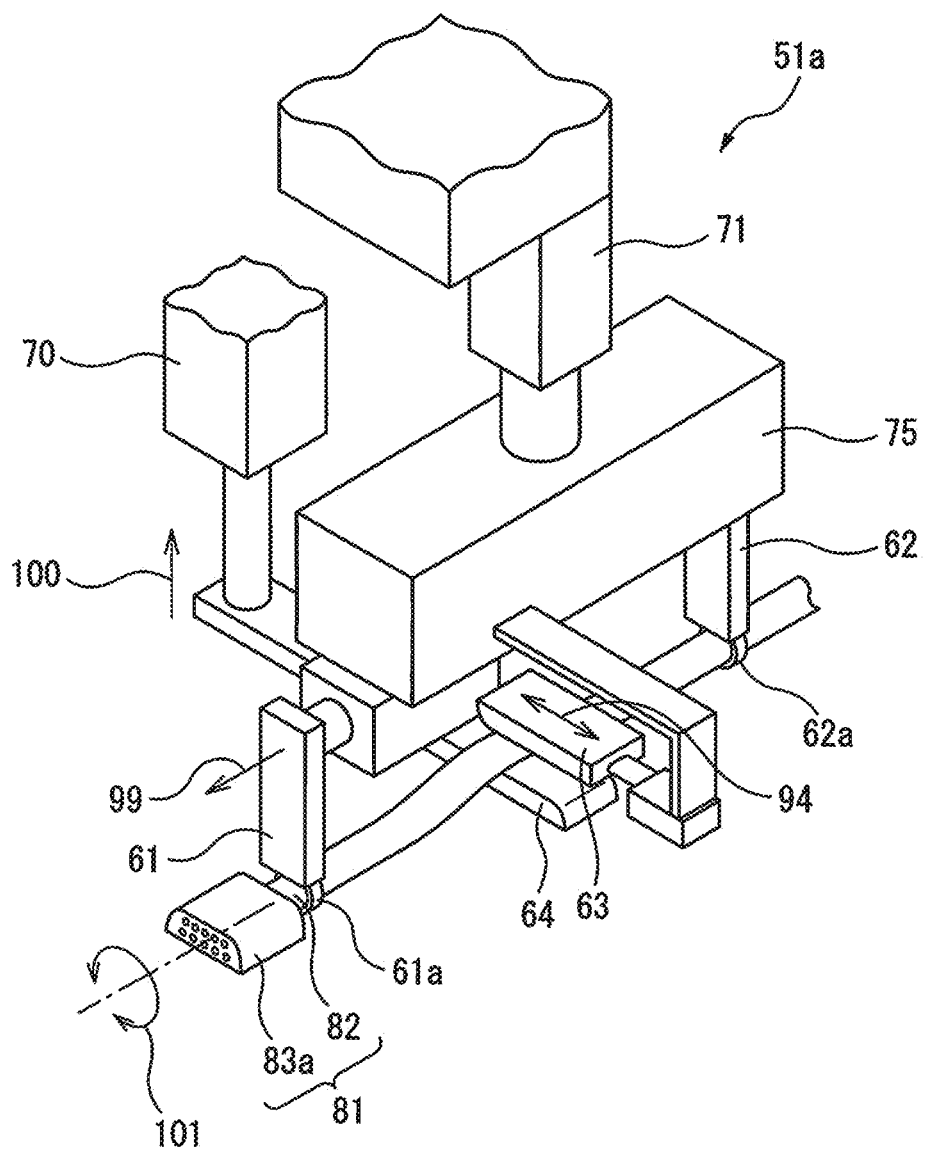
FIG. 6 is another schematic perspective view of the grasping mechanism of the operation tool.

FIG. 6 is a schematic perspective view of the grasping mechanism when the grasping mechanism adjusts the direction of a connector. The first chuck part 61 and the second chuck part 62 weaken the grasping force for grasping the wire member 82. The chuck parts 61 and 62 weaken the grasping force to such an extent that the wire member 82 is not accidentally released. The chuck parts 61 and 62 grasp the wire member 82 so that the wire member 82 can rotates inside the claws 61a and 62a.

Subsequently, the drive device 65 drives the clamping member drive cylinder 70 so as to move the second clamping member 64 toward the first clamping member 63 as indicated by arrow 100. With this control, the wire member 82 is sandwiched by the first clamping member 63 and the second clamping member 64. The wire member 82 is slightly bent. It should be noted that the first chuck part 61 is preferably disposed away from the second chuck part 62 so that the amount of bending of the wire member 82 is reduced.

Subsequently, the first clamping member 63 moves in the direction indicated by arrow 94 so that the wire member 82 can rotate. As a result, the connector 83a rotates and changes its direction as indicated by arrow 101. The connector 83a rotates around its rotation axis that is parallel to the extending direction of the tip part of the wire member 82. The direction of the connector 83a with respect to the operation tool 2 is adjusted so as to be a predetermined direction. In particular, the rotation angle of the connector 83a around the extending direction of the wire member 82 can be adjusted. In this way, the direction of the connector 83a can be adjusted so that the direction of the connector 83a corresponds to the direction of the insertion port of the receiving connector of the printed board.

After the adjustment of the direction of the connector 83a is completed, the second chuck part 62 increases the force for grasping the wire member 82. The wire member 82 is firmly grasped by the second chuck part 62 so as not to rotate. The clamping member drive cylinder 70 moves the second clamping member 64 away from the first clamping member 63. The clamping of the wire member 82 by the first clamping member 63 and the second clamping member 64 is released.

Subsequently, the drive device 65 moves the first chuck part 61 in the direction indicated by arrow 99. The first chuck part 61 moves in a direction away from the second chuck part 62. The first chuck part 61 can be brought into contact with the first connector 83a so as to apply tension to the wire member 82. Subsequently, the first chuck part 61 increases the force for grasping the wire member 82. The wire member 82 is strongly grasped by the chuck parts 61 and 62 so as not to rotate inside the claws 61a and 62a.

After that, the robot 1 changes its position and orientation and thereby inserts the first connector 83a into the insertion port of the corresponding receiving connector of the printed board. Since the direction of the first connector 83a with respect to the operation tool 2 is adjusted, the robot controller 4 can easily match the phase (direction) of the first connector 83a with the phase (direction) of the insertion port. The first connector 83a can be reliably inserted into the insertion port of the receiving connector.

Referring to FIGS. 3 and 5, the operation tool 2 in the present embodiment has a plurality of grasping mechanisms 51a, 51b and 51c. The drive device 65 of the grasping mechanism 51a has the frame drive cylinder 71 and the clamping member drive cylinder 70, which move the grasping mechanism 51a away from or closer to the support member 22 of the operation tool 2. In some cases, when one grasping mechanism tries to grasp the wire member 82, the other grasping mechanisms come into contact with the placement surface of the wire harness 81 and then the former grasping mechanism cannot grasp the wire harness 81. In the present embodiment, when one grasping mechanism tries to grasp the wire member 82, the other grasping mechanisms can be controlled so as to be separated from the surface on which the wire harness 81 is placed.

For example, when the first grasping mechanism 51a tries to grasp the wire harness 81, the frame drive cylinder 71 and the clamping member drive cylinder 70 are driven so that the frame 75 and the second clamping member 64 move away from the support member 22. The first grasping mechanism 51a moves in a direction approaching the wire harness 81. In contrast, in the second grasping mechanism 51b and the third grasping mechanism 51c, the frame drive cylinder 71 and the clamping member drive cylinder 70 are driven so that the frame 75 and the second clamping member 64 move closer to the support member 22. The second grasping mechanism 51b and the third grasping mechanism 51c move in a direction away from the wire harness 81. With this control, when one grasping mechanism is controlled so as to grasp the wire member 82, the other grasping mechanisms can be prevented from coming into contact with the wire harness 81 or the placement surface of the wire harness 81. As a result, the wire member 82 can be stably grasped by one grasping mechanism.

Figure 7:
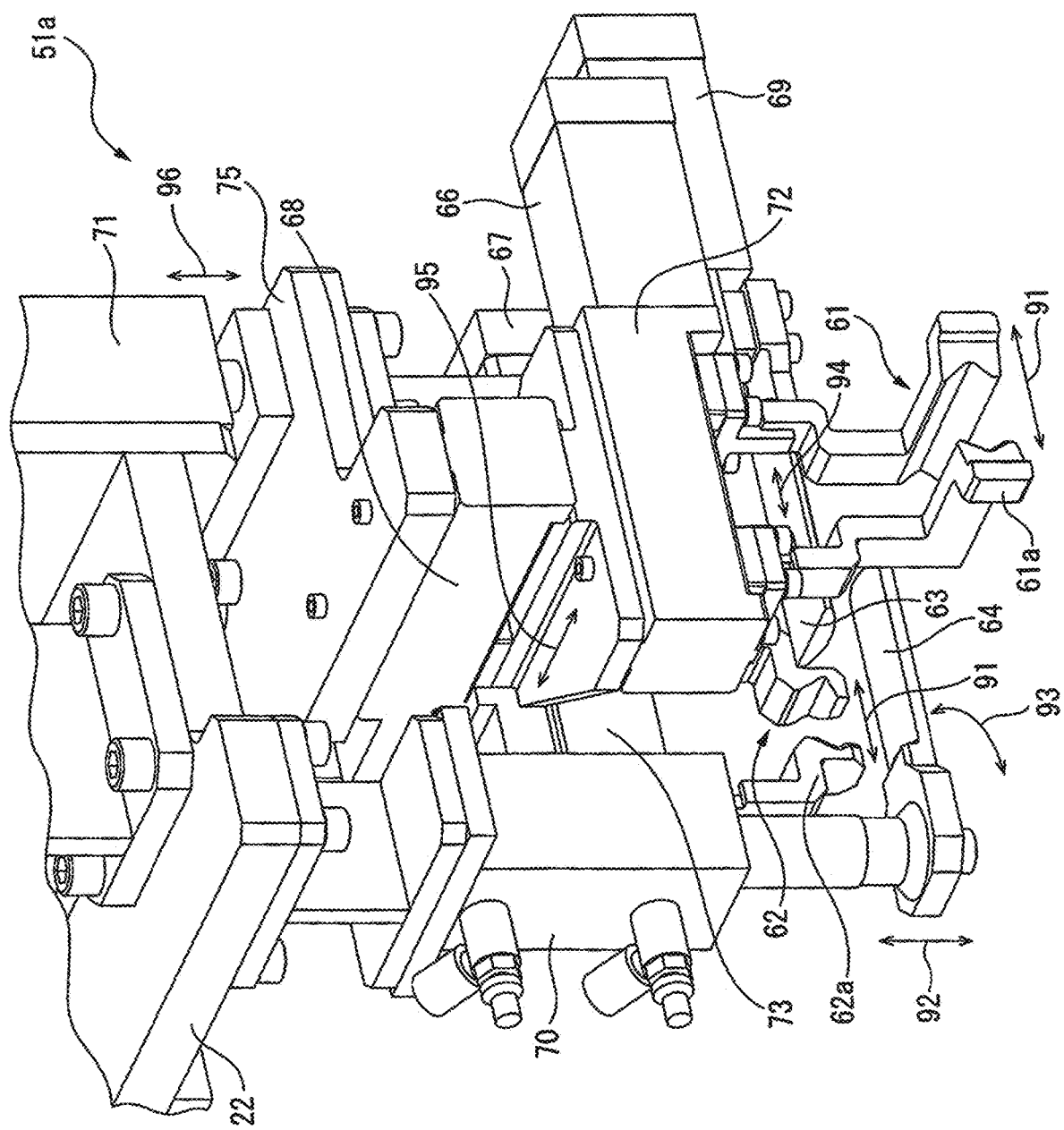
FIG. 7 is a perspective view of the grasping mechanism of the operation tool in the embodiment.
Figure 8:
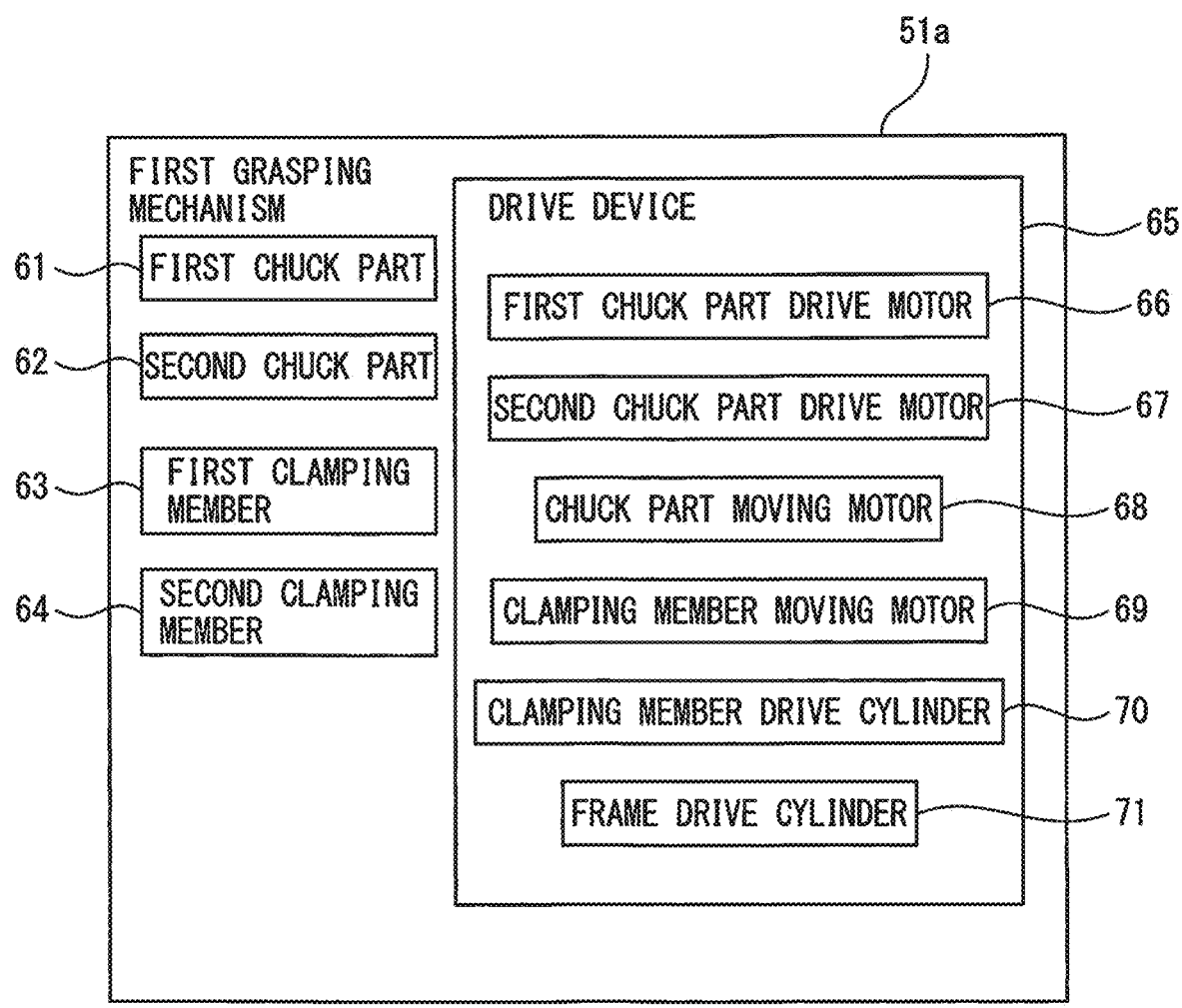
FIG. 8 is a block diagram of the grasping mechanism of the operation tool.

A specific configuration of the grasping mechanism in the present embodiment will now be described. FIG. 7 is an enlarged perspective view of the grasping mechanism of the operation tool in the present embodiment. FIG. 7 is a perspective view of the grasping mechanism 51a shown in FIGS. 5 and 6 when viewed from another direction. FIG. 8 is a block diagram of the grasping mechanism in the present embodiment. The first grasping mechanism 51a of the grasping mechanisms 51a, 51b and 51c will now be described. With reference to FIGS. 5, 7 and 8, the first chuck part 61 and the second chuck part 62 are linearly arranged. The claws 61a and 62a have a recess corresponding to the shape of the wire member 82. The first clamping member 63 and the second clamping member 64 are arranged so as to extend in a direction perpendicular to the extending direction of the wire member 82 grasped by the chuck parts 61 and 62.

The drive device 65 of the first grasping mechanism 51a has a first chuck part drive motor 66 that drives the claws 61a of the first chuck part 61 in the direction indicated by arrow 91. The drive device 65 has a power conversion device 72 that converts the rotational motion of the output shaft of the first chuck part drive motor 66 into the linear motion of the claws 61*a*. The first chuck part drive motor 66 is driven so that the claws 61*a* are opened or closed. The drive device 65 has a second chuck part drive motor 67 that drives the claws 62*a* of the second chuck part 62 in the direction indicated by arrow 91. The drive device 65 has a power conversion device 73 that converts the rotational motion of the output shaft of the second chuck part drive motor 67 into the linear motion of the claws 62*a*. The second chuck part drive motor 67 is driven so that the claws 62*a* are opened or closed. It should be noted that the power conversion devices 72 and 73 may include reduction gears that reduce the rotational speed of the output shafts of the chuck part drive motors 66 and 67.

The drive device 65 has a chuck part moving motor 68 that moves the first chuck part 61 in the direction indicated by arrow 95 in order to apply tension to the wire member 82. The drive device 65 has a clamping member moving motor 69 that moves the first clamping member 63 in the direction indicated by arrow 94. The drive device 65 has the clamping member drive cylinder 70 that moves the second clamping member 64 in the direction indicated by arrow 92 or rotates the same in the direction indicated by arrow 93. The frame 75 supports the chuck parts 61 and 62, the chuck part drive motors 66 and 67, the chuck part moving motor 68, the first clamping member 63, and the clamping member moving motor 69. The drive device 65 has the frame drive cylinder 71 that moves the frame 75 as indicated by arrow 96. The frame drive cylinder 71 is driven and thereby integrally moves the members supported by the frame 75 such as the chuck parts 61 and 62.

It should be noted that the components which constitute the grasping mechanism in the present embodiment are driven by the cylinder or the motor, but are not limited to this configuration. The components which constitute the grasping mechanism can be driven by any mechanism. For example, the components which constitute the grasping mechanism may be formed so as to be driven by a magnetic force.

Referring to FIGS. 2 and 3, the operation tool 2 in the present embodiment has a main camera 52 supported by the base member 21. The main camera 52 captures an image of the entirety of the wire harness 81 at a position away from the wire harness 81. The main camera 52 is secured to the central portion of the base member 21 via a camera support member 24. The operation tool 2 includes a first auxiliary camera 53*a* disposed in the vicinity of the first grasping mechanism 51*a*, a second auxiliary camera 53*b* disposed in the vicinity of the second grasping mechanism 51*b*, and a third auxiliary camera 53*c* disposed in the vicinity of the third grasping mechanism 51*c*.

The auxiliary cameras 53*a*, 53*b* and 53*c* are respectively arranged around the grasping mechanisms 51*a*, 51*b* and 51*c*. Each auxiliary camera 53*a*, 53*b*, 53*c* captures an image of one connector placed on the placement surface and an image of a portion of the wire member 82 in the vicinity of the connector, when the wire harness 81 is grasped. Each auxiliary camera 53*c*, 53*b*, 53*c* is supported by the support member 22 via a camera support member 24.

It should be noted that the main camera 52, the auxiliary cameras 53*a*, 53*b* and 53*c*, and the inclination detection camera 7 of the present embodiment are two-dimensional cameras, but are not limited to this configuration. Each camera may be a three-dimensional camera.

The robot controller 4 has a signal processing unit 31 that receives signals from the main camera 52, the auxiliary cameras 53*a*, 53*b* and 53*c*, and the inclination detection camera 7 and processes the signals. The signal processing unit 31 includes an image processing unit 32 that processes an image captured by each camera.

The image processing unit 32 detects the direction of the connectors 83*a*, 83*b* and 83*c* with respect to the operation tool 2 by processing the image from the inclination detection camera 7. The signal processing unit 31 has a determination unit 33 that determines whether the direction of the connectors 83*a*, 83*b* and 83*c* with respect to the operation tool 2 is appropriate, based on the result of processing the image captured by the inclination detection camera 7. The determination range for the direction of the connector is previously determined and stored in the storage unit 42.

The signal processing unit 31 includes a command unit 35 that sends an operation command to the operation control unit 43. The command unit 35 sends a command for rotating the wire member 82 to the operation control unit 43 when the direction of the connector is out of the determination range. The operation control unit 43 sends a command for rotating the wire member 82 to the drive device 65 of the operation tool 2. In the meantime, when the direction of the connector is within the determination range, the command unit 35 sends a command for inserting the connector into a predetermined portion to the operation control unit 43. In the present embodiment, the operation control unit 43 controls the position and orientation of the robot 1 so that the connector is connected to the receiving connector of the printed board.

Further, the image processing unit 32 detects the position of each of the connectors 83*a*, 83*b* and 83*c* placed on the conveyor 8 based on the image captured by the main camera 52. The command unit 35 sends an operation command for the robot 1 to the operation control unit 43 so that each grasping mechanism is disposed in the vicinity of the connector corresponding to the grasping mechanism. The image processing unit 32 also detects the position of each of the connectors 83*a*, 83*b* and 83*c* and the position of the wire member 82 connected to the connectors 83*a*, 83*b* and 83*c*, based on the images captured by the auxiliary cameras 53*a*, 53*b* and 53*c*. The command unit 35 sends operation commands for the robot 1 and the operation tool 2 to the operation control unit 43 so that one grasping mechanism grasps a region of the wire member 82 in the vicinity of the corresponding connector.

Each of the signal processing unit 31, the image processing unit 32, the determination unit 33, and the command unit 35 corresponds to a processor that is driven according to the operation program 41. The processor reads the operation program 41 and performs a control operation defined in the operation program 41, so as to function as each unit.

Figure 9:
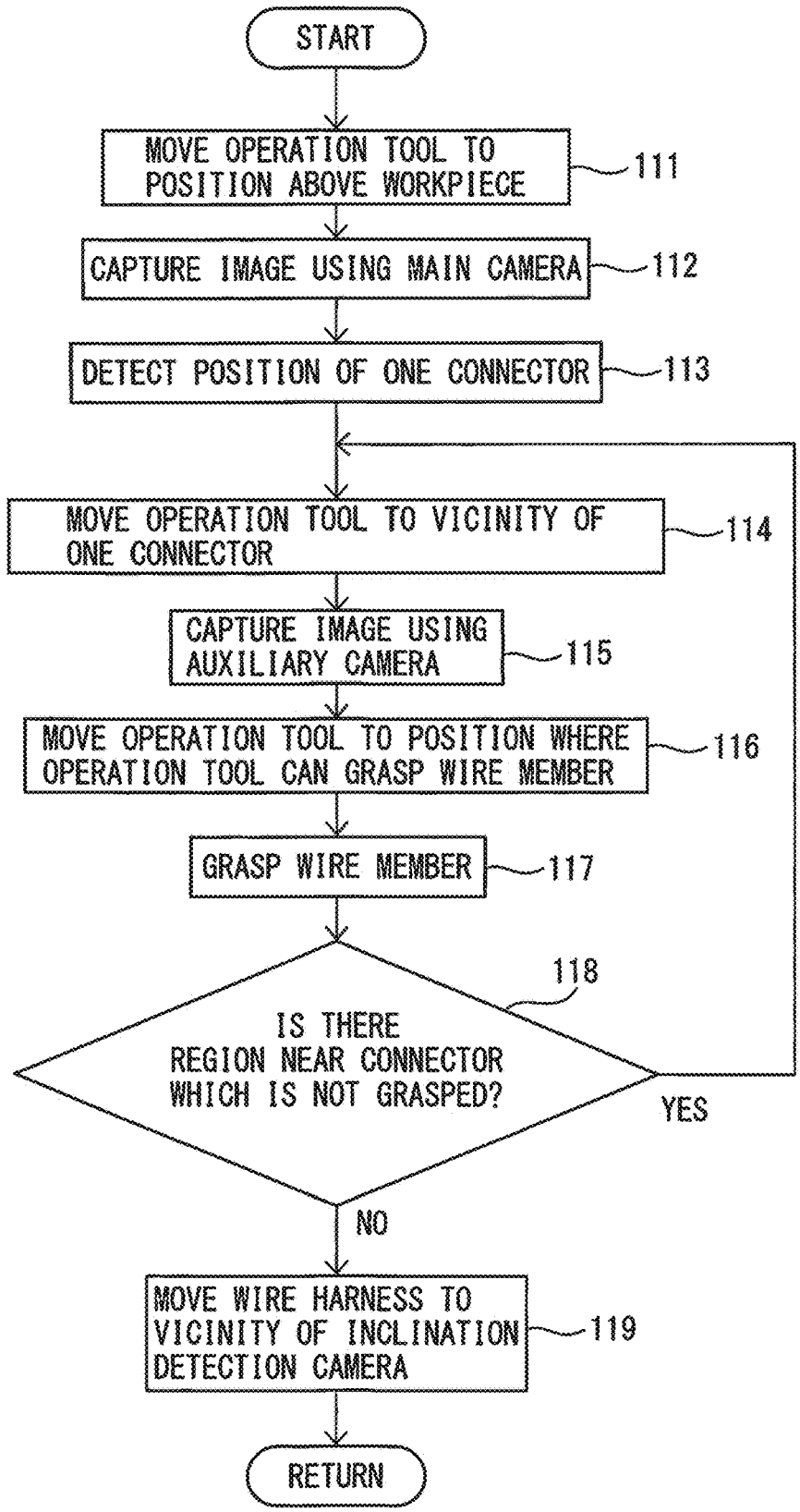
FIG. 9 is a flowchart of control for grasping the wire harness in the robot apparatus.

FIG. 9 is a flowchart of control for grasping the wire harness by the robot apparatus. At step 111, the robot controller 4 causes the robot 1 to changes its position and orientation and thereby disposes the operation tool 2 at a predetermined position above the wire harness 81. Referring to FIG. 4, the conveyor controller 9 causes the conveyor 8 to stop when the wire harness 81 is disposed at a predetermined position. Further, the operation tool 2 is disposed so that the grasping mechanisms 51*a*, 51*b* and 51*c* are respectively arranged above the corresponding connectors 83*a*, 83*b* and 83*c*.

Referring to FIG. 9, at step 112, the main camera 52 captures an image of the entirety of the wire harness 81. At step 113, the image processing unit 32 processes the image captured by the main camera 52. The image processing unit 32 detects the position of one connector by, for example, a pattern matching method. In the pattern matching method, an operator can previously create reference images of a connector disposed in various directions and store the reference images in the storage unit 42. The image processing unit 32 detects the reference image of the connector that matches the image that is captured actually. The image processing unit 32 is calibrated so that the actual position of the connector on the placement surface of the conveyor 8 can be detected from the position of the connector in the image captured by the main camera 52. The image processing unit 32 detects the position of the connector on the placement surface of the conveyor 8.

It should be noted that the image processing unit 32 may detect the direction of the wire harness 81 on the placement surface of the conveyor 8 based on the image captured by the main camera 52. The command unit 35 may control the robot 1 so that the direction of the operation tool 2 is adjusted in accordance with the direction of the wire harness 81. For example, the position and direction of the operation tool 2 may be adjusted so that the first grasping mechanism 51*a* is disposed directly above the first connector 83*a*, the second grasping mechanism 51*b* is disposed directly above the second connector 83*b*, and the third grasping mechanism 51*c* is directly above the third connector 83*c*.

Subsequently, at step 114, the robot controller 4 selects one connector. The robot controller 4 causes the robot 1 to change its position and orientation so that one grasping mechanism is disposed in the vicinity of the selected connector. The control for grasping the wire member 82 in the vicinity of the first connector 83*a* by the first grasping mechanism 51*a* will now be described. The first grasping mechanism 51*a* is disposed in the vicinity of the first connector 83*a*.

Subsequently, at step 115, the robot controller 4 causes the first auxiliary camera 53*a* corresponding to the first grasping mechanism 51*a* to capture an image of the first connector 83*a* and the wire member 82 connected to the first connector 83*a* placed on the conveyor 8. The image processing unit 32 detects the position of the first connector 83*a* and the wire member 82 based on the images captured by the first auxiliary camera 53*a*. The image processing unit 32 detects the position of the connector 83*a* and the wire member 82 in the images by, for example, a pattern matching method. The image processing unit 32 is calibrated so that the actual position of the connector on the placement surface of the conveyor 8 can be detected from the position of the connector in the image captured by the auxiliary camera 53*a*, 53*b* and 53*c*. The image processing unit 32 detects the actual position of the connector on the placement surface of the conveyor 8.

At step 116, the robot 1 changes its position and orientation based on the positions of the first connector 83*a* and the wire member 82, which are detected by the image processing unit 32. The command unit 35 sends a command for causing the region of the wire member 82 in the vicinity of the first connector 83*a* to be grasped by the chuck parts 61 and 62 of the first grasping mechanism 51*a*. More specifically, the operation control unit 43 causes the claws 61*a* and 62*a* of the chuck parts 61 and 62 to be open. The operation controller 43 drives the clamping member drive cylinder 70 so that the second clamping member 64 is retracted from the region through which the wire member 82 passes. The operation control unit 43 causes the first grasping mechanism 51*a* to be disposed at a position away from the support member 22, and causes the clamping member drive cylinders 70 and the frame drive cylinders 71 of the second grasping mechanism 51*b* and the third grasping mechanism 51*c* to be driven so that both the grasping mechanisms move closer to the support member 22. Further, the operation control unit 43 causes the robot 1 to change its position and orientation so that the wire member 82 is disposed between the claws 61*a* of the chuck part 61 and between the claws 62*a* of the chuck part 62.

At step 117, the first grasping mechanism 51*a* grasps a region of the wire member 82 in the vicinity of the first connector 83*a*. The operation control unit 43 controls the drive device 65 so that the first grasping mechanism 51*a* grasps the wire member 82 of the wire harness 81. In other words, the operation control unit 43 performs a control operation for closing the claws 61*a* of the first chuck part 61 and the claws 62*a* of the second chuck part 62. The wire member 82 of the wire harness 81 is grasped by both the chuck parts 61 and 62. At step 117, the chuck parts 61 and 62 can grasp the wire member 82 with a predetermined force. It should be noted that the first chuck part 61 preferably grasps the region of the wire member 82 in the vicinity of a connector and is not to be in contact with the connector.

In this way, the main camera 52 captures an image of the entirety of the wire harness 81 so that the position of each connector 83*a*, 83*b*, 83*c* is detected. Further, when the first grasping mechanism 51*a* is disposed in the vicinity of the first connector 83*a*, the first auxiliary camera 53*a* captures images of the first connector 83*a* and the wire member 82, so that the positions of the first connector 83*a* and the wire member 82 are detected. With this control, the image processing unit 32 can accurately detect the positions of the first connector 83*a* and the wire member 82. The first grasping mechanism 51*a* can reliably grasp the wire member 82.

Incidentally, in the present embodiment, the chuck parts 61 and 62 are driven by the chuck part drive motors 66 and 67. Thus, the current supplied to the chuck part drive motors 66 and 67 is adjusted, and thus the grasping force for grasping the wire member 82 can be easily adjusted. For example, the drive circuit that supplies current to the chuck part drive motors 66 and 67 may have a feedback circuit that controls the rotational position and rotation speed of the chuck part drive motors 66 and 67. In this respect, a feedback current value is detected so that the grasping force can be easily adjusted. For example, if the feedback current is controlled so as to increase, the grasping force can be increased. Further, the chuck part drive motors 66 and 67 can easily adjust the positions of the claws 61*a* and 62*a*. Accordingly, the claws 61*a* and 62*a* may be controlled so as to be closed to a predetermined position according to the diameter of the wire member 82.

Subsequently, at step 118, the robot controller 4 determines whether there is a region of the wire member 82 in the vicinity of each connector, which is not grasped by the grasping mechanism. If there is a region of the wire member 82 in the vicinity of each connector, which is not grasped by the grasping mechanism, the control returns to step 114. Further, the control at step 114 to the control at step 118 are repeated so that each grasping mechanism grasps the region of the wire member 82 in the vicinity of the connector corresponding to the grasping mechanism. In the present embodiment, steps from step 114 to step 118 are repeated until he three grasping mechanisms 51*a*, 51*b* and 51*c* grasp the regions of the wire member 82 in the vicinity of the three connectors 83*a*, 83*b* and 83*c*.

At step 118, when the regions of the wire member 82 in the vicinity of all the connectors 83*a*, 83*b* and 83*c* are grasped, the control shifts to step 119. At step 119, the robot 1 moves the wire harness 81 to an angle detection device. Referring to FIG. 1, the robot 1 moves the operation tool 2 to the vicinity of the inclination detection camera 7.

Figure 10:
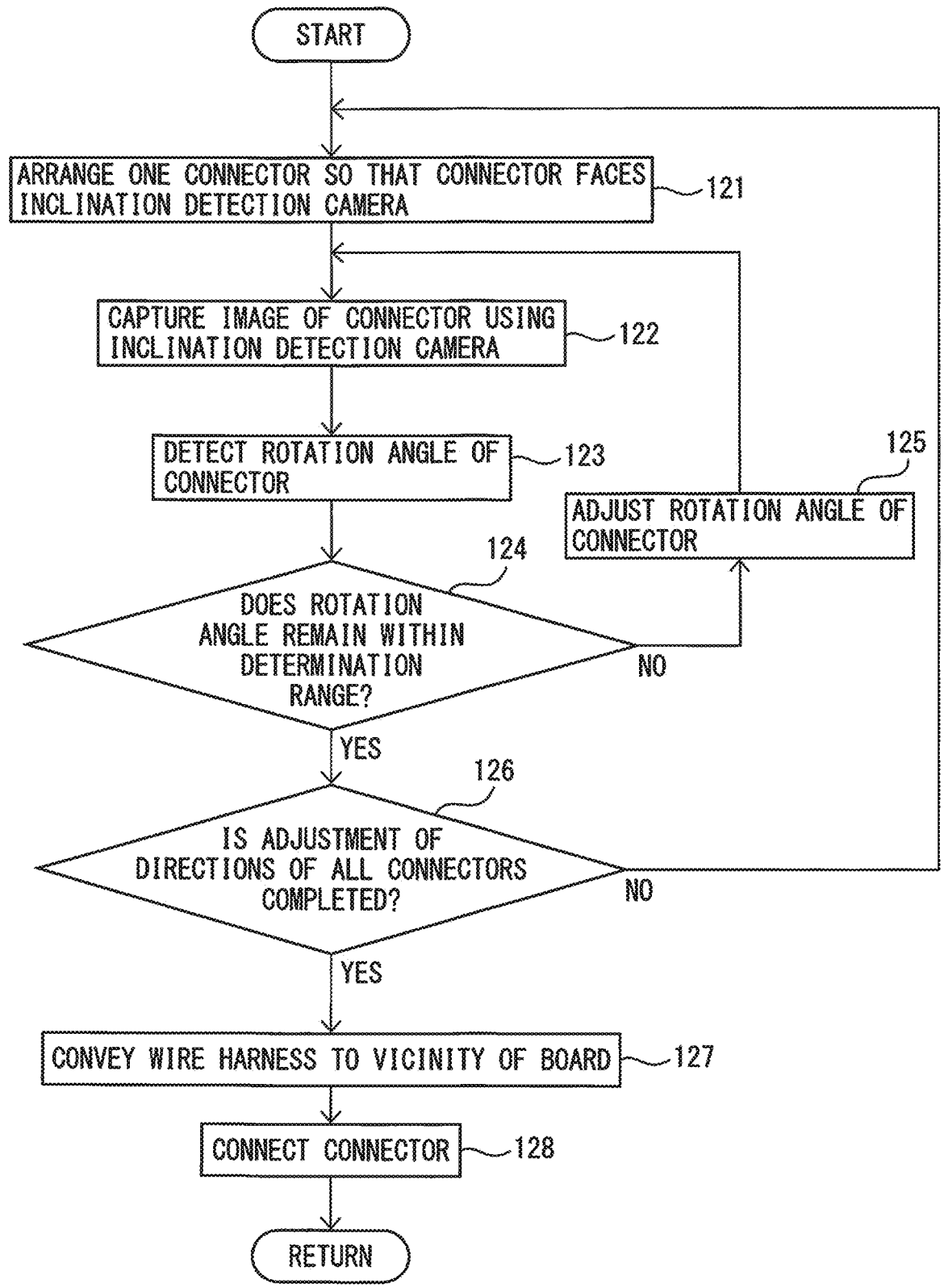
FIG. 10 is a flowchart of control for connecting the wire harness to the receiving connector of a printed board in the robot apparatus.

FIG. 10 is a flowchart of control for connecting the connector to the receiving connector of the printed board. At step 121, the robot 1 changes the position and direction of the operation tool 2 so that one connector faces the inclination detection camera 7. The first connector 83a will now be described as an example.

At step 122, the inclination detection camera 7 captures an image of the first connector 83a. At step 123, the image processing unit 32 of the signal processing unit 31 processes the image of the first connector 83a captured by the inclination detection camera 7.

Figure 11:
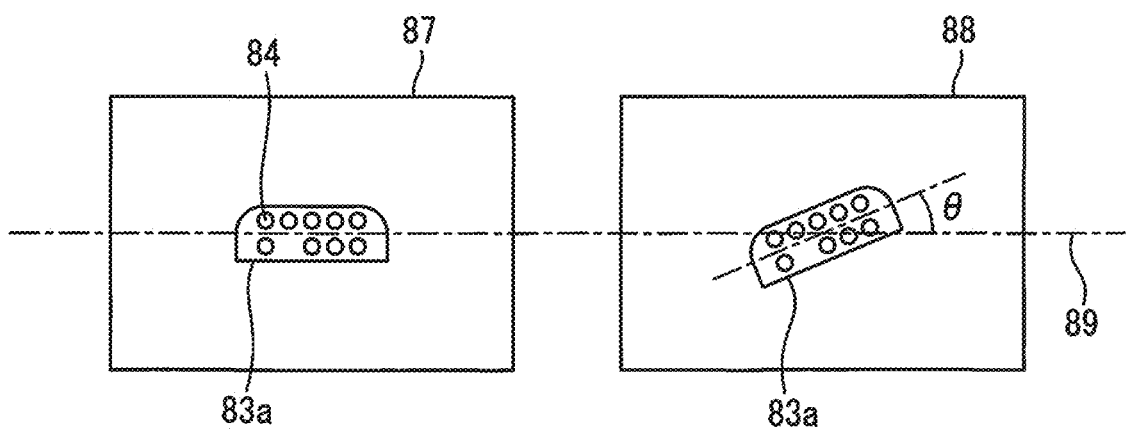
FIG. 11 shows an example of an image captured by an inclination detection camera in the embodiment.

FIG. 11 shows an example of an image captured by the inclination detection camera. An image 87 is an image of the first connector 83a when the first connector 83a is grasped in a desired direction. A reference line 89 that indicates the reference direction in this example is a line parallel to the horizontal direction. The direction, in which a plurality of terminals 84 are laterally arranged, corresponds to the direction of the first connector 83a. The direction, in which the plurality of terminals 84 are laterally arranged, is parallel to the reference line 89. Such a reference direction of the first connector 83a is previously determined corresponding to the direction of the insertion port of the receiving connector on the printed board. Further, the reference direction is stored in the storage unit 42. In an image 88, the first connector 83a is inclined with respect to the reference line 89. In the image 88, the direction of the first connector 83a is inclined with respect to a desired direction.

At step 123, the image processing unit 32 detects the position and direction of the first connector 83a in the image by, for example, a pattern matching method. The image processing unit 32 detects the rotation angle θ of the first connector 83a with respect to the reference line 89. The rotation angle θ corresponds to the amount of deviation of the direction of the first connector 83a.

Subsequently, at step 124, the determination unit 33 of the signal processing unit 31 determines whether the direction of the first connector 83a remains within the determination range. Here, the determination unit 33 determines whether the rotation angle θ of the first connector 83a remains within a predetermined determination range. At step 124, when the rotation angle θ does not remain within the determination range, the control shifts to step 125.

At step 125, the rotation angle of the first connector 83a is adjusted. The command unit 35 of the signal processing unit 31 sends a command for rotating the wire member 82 to the operation control unit 43 so that the rotation angle θ of the first connector 83a changes toward the value within the determination range. The operation control unit 43 drives the drive device 65.

The chuck part drive motors 66 and 67 reduce the grasping force of the chuck parts 61 and 62 for the wire member 82. The clamping member drive cylinder 70 rotates the second clamping member 64 and causes the same to face the first clamping member 63. The clamping member drive cylinder 70 moves the second clamping member 64 toward the first clamping member 63. The wire member 82 is clamped between the clamping members 63 and 64.

After that, the clamping member moving motor 69 moves the first clamping member 63 and rotates the wire member 82. The first connector 83a rotates along with the wire member 82, and the direction of the first connector 83a can be adjusted. In this respect, the signal processing unit 31 may calculate the movement distance of the first clamping member 63 based on the rotation angle θ of the first connector 83a. Alternatively, the first clamping member 63 may be moved by a predetermined distance.

After the control at step 125 is completed, the control shifts to step 122. Further, at steps 122 to 124, an image of the first connector 83a is captured by the inclination detection camera 7, and whether the rotation angle of the first connector 83a remains within the determination range is determined. Thus, the rotation angle of the first connector 83a is adjusted until the rotation angle reaches a value within the determination range.

At step 124, when the rotation angle of the first connector 83a remains within the determination range, the chuck part moving motor 68 is driven so as to apply tension to the wire member 82, and the chuck part drive motors 66 and 67 are driven so that the chuck parts 61 and 62 firmly grasp the wire member 82.

The first chuck part 61 of the present embodiment is formed so as to be moved by the chuck part moving motor 68. Consequently, the current supplied to the chuck part moving motor 68 is adjusted so that the tension applied to the wire member 82 can be easily adjusted. For example, as in the chuck part drive motors 66 and 67, the current value of the feedback circuit for driving the chuck part moving motor 68 is detected so that the tension applied to the wire member 82 can be easily adjusted.

Subsequently, the control shifts to step 126. At step 126, whether the directions of all the connectors 83a, 83b and 83c have been adjusted is determined. If there is a connector, the direction of which is not adjusted at step 126, the control shifts to step 121. Further, the direction of each connector is adjusted by the control at steps 121 to 126. In this way, the rotation angle of the connectors 83a, 83b and 83c in the vicinity of the wire member 82 grasped by the grasping mechanisms 51a, 51b and 51c is adjusted.

If the adjustment of the directions of all the connectors has been completed at step 126, the control shifts to step 127. At step 127, the wire harness 81 is conveyed to the vicinity of the printed board into which the connectors 83a, 83b and 83c are inserted.

At step 128, the connectors 83a, 83b and 83c are connected to the receiving connectors on the printed board. Since the direction of the connectors 83a, 83b and 83c with respect to the operation tool 2 is adjusted, the connectors 83a, 83b and 83c can be reliably connected to the receiving connectors. The control at step 128 can be performed by any control method. For example, the images of the receiving connectors are captured by the auxiliary cameras, so that the positions of the receiving connectors can be detected. The robot controller can control the position and orientation of the robot so that each connector of the wire harness is inserted into the receiving connector based on the position of the receiving connector.

As described above, the operation tool 2 of the present embodiment can adjust the direction of the connectors 83a, 83b and 83c while grasping the wire harness 81. Even if the robot 1 does not change its position and orientation, the mechanism of the operation tool 2 can adjust the direction of the connectors 83a, 83b and 83c. Even when the wire harness 81 is grasped with the connectors, the directions of which are different from one another, the directions of the connectors 83a, 83b and 83c can be adjusted so as to correspond to the directions of the insertion ports of the receiving connectors. It is not necessary to previously place the wire harness in a predetermined direction before the robot apparatus grasps the wire harness, and accordingly, the robot apparatus can be easily automated. Furthermore, the robot apparatus 5 of the present embodiment can convey the wire harness 81, and connect the connectors 83a, 83b and 83c to the receiving connectors of another device.

The operation tool 2 in the present embodiment includes the main camera 52 and the auxiliary cameras 53a, 53b and 53c, but is not limited to this configuration. The operation tool may not include at least either of the main camera and the auxiliary cameras. For example, the main camera and the auxiliary cameras may be secured at positions where the image of the wire harness conveyed by the conveyor can be captured. Alternatively, when the main camera has high performance, the detailed position of each connector may be detected based on the image captured by the main camera. In this respect, the auxiliary cameras may not be arranged.

The detector for detecting the direction of the connector of the present embodiment includes an inclination detection camera that captures an image of the connector, but is not limited to this configuration. Any detector that can detect the direction of the connector can be adopted. For example, a position sensor that detects the positions of two portions of each connector may be disposed so that the direction of the connector can be detected.

The operation tool 2 in the present embodiment includes a plurality of grasping mechanisms 51a, 51b and 51c, but is not limited to this configuration. One grasping mechanism may be disposed in the operation tool.

The workpiece of the present embodiment is conveyed by the conveyor, but is not limited to this configuration. The control of the present embodiment can be applied to a robot apparatus to which a workpiece is supplied by any mechanism. For example, the workpiece may be placed on a working table by another robot apparatus, and the robot apparatus of the present embodiment may grasp the workpiece on the working table.

According to an aspect of the present disclosure, it is possible to provide an operation tool that grasps a workpiece including a wire member and a connector and adjusts the direction of the connector, and a robot apparatus including the operation tool.

In each of the above-described control operations, the order of the steps can be appropriately changed within a range where the function and the action are not changed.

The above embodiments can be combined as appropriate. In the respective drawings described above, the same or equivalent parts are denoted by the same reference numerals. It should be noted that the above embodiments are for purposes of illustration and not limitation. Further, in the embodiments, modifications of the embodiments shown in the claims are included.

The invention claimed is:

1. An operation tool attached to a robot, comprising
a grasping mechanism for grasping a workpiece including
a wire member and a connector attached to an end of the wire member, wherein
the grasping mechanism includes a plurality of chuck parts formed so as to grasp the wire member,
two clamping members arranged opposite to each other so as to sandwich the wire member in a region between the plurality of chuck parts, and
a drive device for driving members constituting the grasping mechanism,
the drive device includes a movement mechanism for moving at least one clamping member in a direction in which the two clamping members move closer to or away from each other, and a rotation mechanism for relatively moving one of the two clamping members with respect to the other clamping member so as to rotate the wire member in a state in which the wire member is grasped by the chuck parts, and
the movement mechanism is driven so that the wire member is sandwiched by the two clamping members, and the rotating mechanism is driven so that the wire member is rotated around the axial direction of the wire member.

2. The operation tool according to claim 1, wherein one of the two clamping members is disposed in a region through which the wire member passes when the chuck parts grasp the wire member, and
the drive device has a mechanism for rotating the one of the clamping members so that the one of the clamping members moves away from the region through which the wire member passes.

3. The operation tool according to claim 1, wherein
the drive device has a mechanism for applying tension to the wire member by moving at least one of the two chuck parts in a direction in which the chuck parts move away from each other while the chuck parts grasp the wire member.

4. The operation tool according to claim 1, further comprising:
a plurality of the grasping mechanisms; and
a support member for supporting a plurality of the grasping mechanisms; wherein
the workpiece includes a plurality of connectors, and
a plurality of the grasping mechanisms are secured to the support member at positions corresponding to the positions of the plurality of connectors.

5. The operation tool according to claim 1, further comprising:
a plurality of the grasping mechanisms; and
a support member for supporting a plurality of the grasping mechanisms; wherein
the drive device has a mechanism for moving each of the grasping mechanisms away from or closer to the support member.

6. A robot apparatus comprising:
the operation tool according to claim 1;
a robot for moving the operation tool;
a controller for controlling the operation tool and the robot; and
a detector for detecting the direction of the connector when the operation tool grasps the wire member; wherein
the controller detects the direction of the connector based on the output of the detector, and sends a command for rotating the wire member to the drive device when the direction of the connector deviates from a predetermined determination range, and
when the direction of the connector remains within the determination range, the controller controls position and orientation of the robot so that the connector is inserted into a predetermined portion.

7. The robot apparatus according to claim 6, wherein
the detector includes an inclination detection camera for capturing an image of a connector while a workpiece is grasped by the operation tool,
the controller includes an image processing unit for processing the image captured by the inclination detection camera, and
the image processing unit detects the direction of the connector with respect to the operation tool by processing the image of the connector.

8. The robot apparatus according to claim 6, wherein
the operation tool includes a main camera for capturing an image of the entirety of the workpiece at a position away from the workpiece, and an auxiliary camera for capturing an image of one connector placed on a placement surface when the workpiece is grasped,
the controller includes an image processing unit for processing images captured by the main camera and the auxiliary camera,
the image processing unit detects a position of the connector by processing the images captured by the main camera and the auxiliary camera, and
the controller controls the position and orientation of the robot so that the operation tool moves to vicinity of the connector based on the image captured by the main camera, and controls the position and orientation of the robot so that the chuck parts grasp the wire member based on the image captured by the auxiliary camera.

* * * * *